INVENTOR.
FRANK T. COURT

Sept. 28, 1948.  F. T. COURT  2,450,270
HYDRAULIC MECHANISM, ESPECIALLY PLURAL
CYLINDER SYSTEM AND CONTROL THEREFOR
Filed May 24, 1945  5 Sheets-Sheet 2
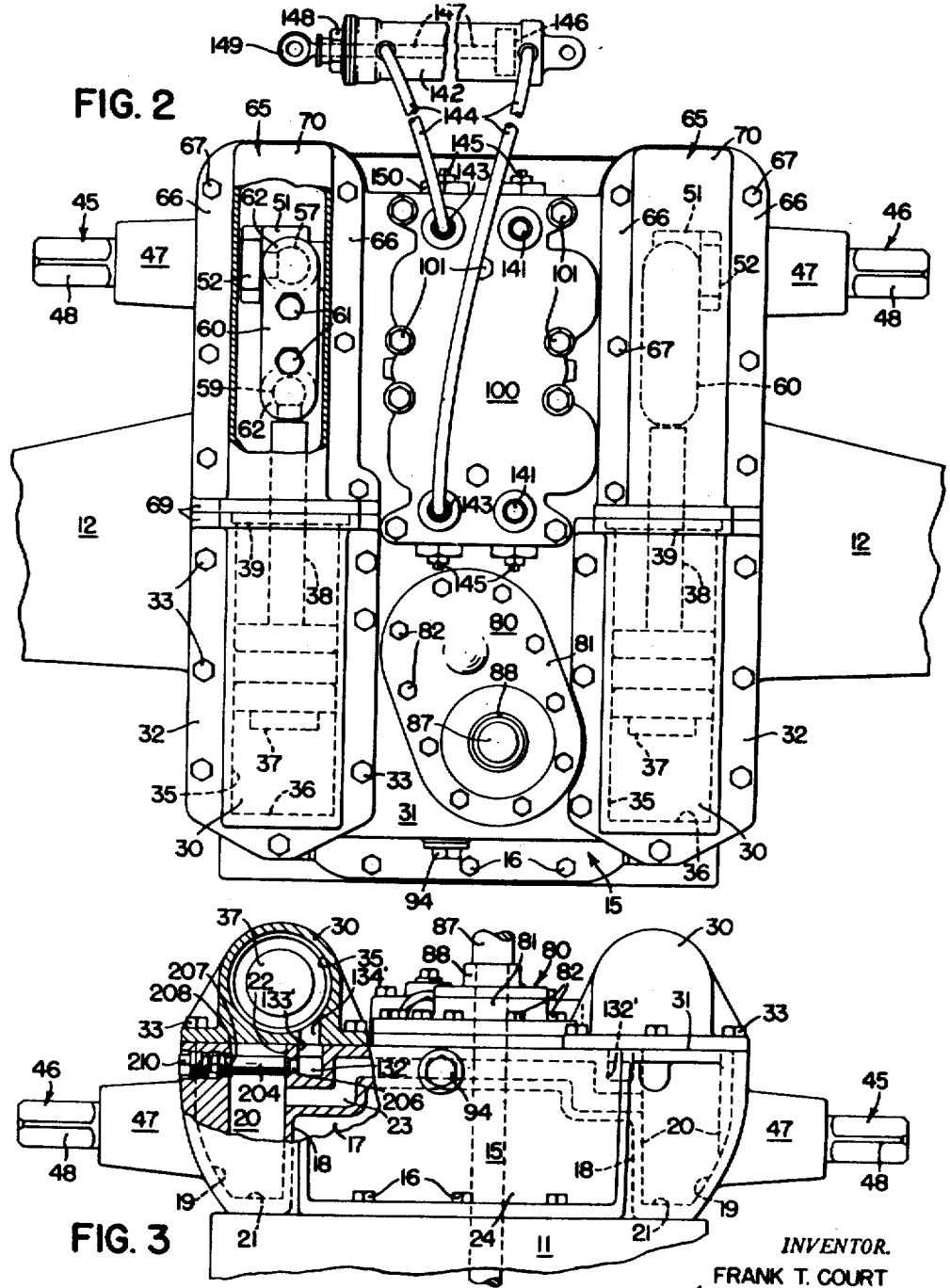
INVENTOR.
FRANK T. COURT
BY 
ATTORNEYS

INVENTOR.
FRANK T. COURT

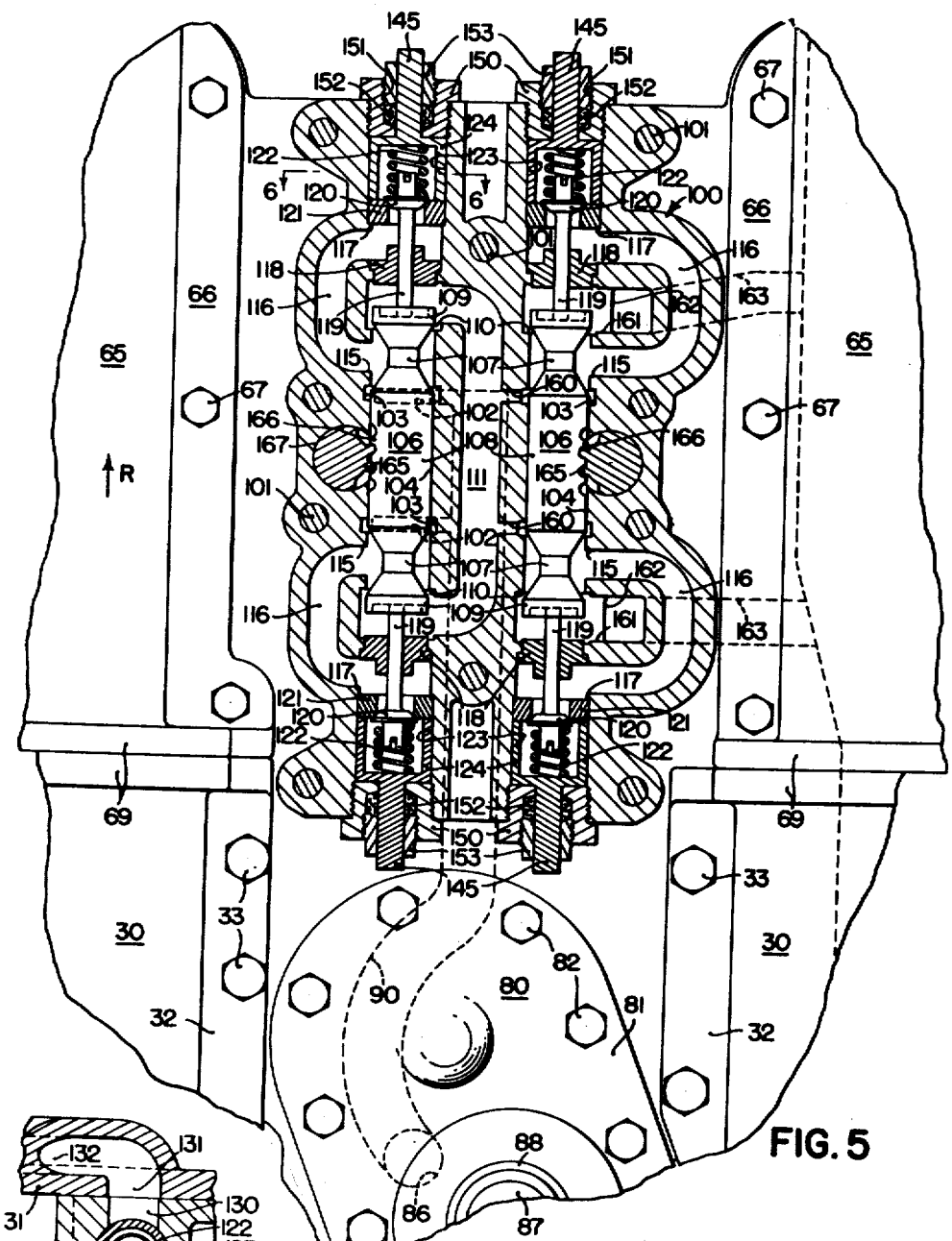

Sept. 28, 1948.   F. T. COURT   2,450,270
HYDRAULIC MECHANISM, ESPECIALLY PLURAL
CYLINDER SYSTEM AND CONTROL THEREFOR
Filed May 24, 1945   5 Sheets-Sheet 5
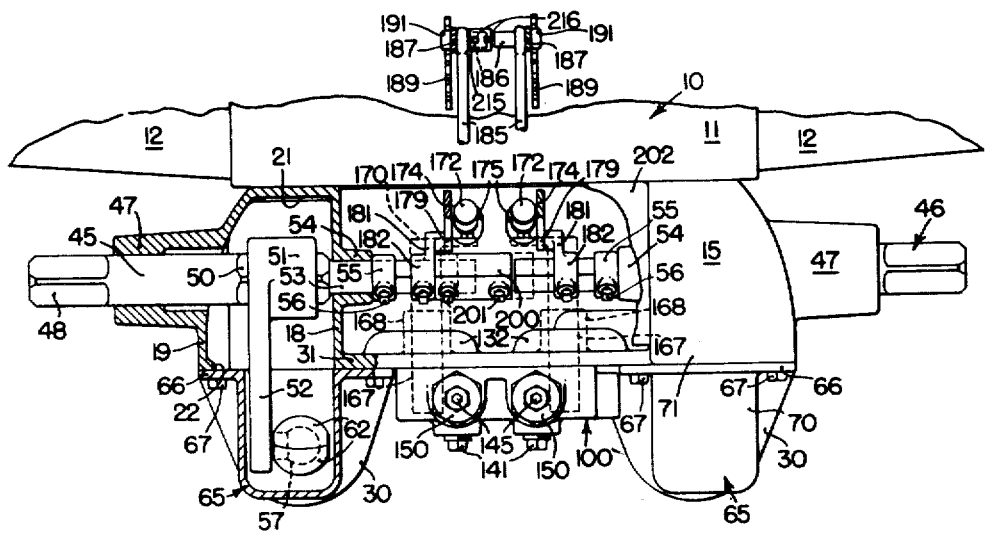
FIG. 7
*INVENTOR.*
FRANK T. COURT
BY
ATTORNEYS Patented Sept. 28, 1948

2,450,270

UNITED STATES PATENT OFFICE 2,450,270

HYDRAULIC MECHANISM, ESPECIALLY PLURAL CYLINDER SYSTEM AND CONTROL THEREFOR

Frank T. Court, Moline, Ill., assignor to Deere & Company, Moline, Ill., a corporation of Illinois Application May 24, 1945, Serial No. 595,631

17 Claims. (Cl. 60—97)

1

The present invention relates generally to hydraulic mechanism and is most advantageously applied to hydraulic power lift mechanism for raising and lowering implements associated with the tractor, either mounted on the latter or propelled thereby, and has for its principal object the provision of a novel and improved hydraulic power lift mechanism that is simple and compact, but which can be employed for a greater number of diversified operations than mechanism heretofore known in the art, and which can be quickly and easily converted from one type of control operation to another.

A further object relates to the provision of a hydraulic power lift device for tractors, including two independently controlled rockshafts for independently raising and lowering the implements mounted on opposite sides of the tractor, selectively, such as, for example, cultivating or planting implements when used on pointed rows.

Still another object relates to the provision of a power lift device including two cylinders and two rockshafts, together with dual control mechanism therefor, contained in a unitary compact housing structure which can be mounted over the rear opening in a rear axle housing of the banjo type. In the accomplishment of this object, I have provided a unitary self-contained housing structure which can be substituted for the conventional power lift housing shown and described in Patent 2,302,637 granted to McCormick and Hansen, November 17, 1942.

Still another object relates to the provision of power lift mechanism including two cylinders for actuating two separate rockshafts, the cylinders being driven by a single hydraulic pump and controlled by valve mechanism which provides for actuation of the rockshaft at a uniform speed, regardless of whether the rockshafts are actuated simultaneously or independently. Either of the cylinders can be actuated independently, and the other cylinder can be started moving before the first cylinder has reached the end of its travel, without changing the speed of movement of the latter.

Although the rockshafts and their connected cylinders are preferable for use with tractor mounted implements, it is frequently desirable to mount control cylinders on trailing implements, such as corn pickers, combines, and the like. It is desirable, however, to use as much as possible of the tractor mounted hydraulic mechanism, such as the control valve mechanism and the pump and reservoir, for controlling the remote cylinders, and therefore it is another object

2 of my invention to provide means for quickly and easily connecting one or two remote cylinders to the integral valve control mechanism for controlling the remote cylinders from the tractor operator's station. A related object has to do with the provision of suitable 3-way valves incorporated in the unitary valve control mechanism, by means of which the built in cylinders can be cut out of the hydraulic circuit and the remote cylinders connected to the valve mechanism for actuation thereby.

Another object of my invention has to do with the provision for moving the remote cylinders at the same speed of operation, regardless of whether they are controlled independently or simultaneously.

A still further object relates to the provision of control mechanism for the integral cylinders including control levers which move through a distance proportional to the distance of travel of the associated hydraulic cylinders, whereby the position of the control lever at any time is an indication of the position of the piston in the cylinder. A related object has to with the provision of means for applying this same control principle to a remote cylinder. In this connection, it is an object to provide control connections by which a remote cylinder can be connected to one of the valve mechanisms in place of its associated tractor mounted cylinder, while the other tractor mounted cylinder is used as a metering cylinder to measure the amount of oil flowing either into or out of the remote cylinder, in order to synchronize the movements of the operator's control levers with the movements of the remote cylinder, thus causing the position of the operator's levers to serve as an indication of the position of the piston in the remote cylinder.

These and other objects and advantages of my invention will be apparent to those skilled in the art after a consideration of the following description, in which reference is had to the drawings appended hereto, in which Figure 1 is a side elevational view of the banjo type rear axle housing of a tractor, with power lift mechanism mounted thereon, embodying the principles of the present invention.

Figure 2 is a rear view of the axle housing and power lift mechanism, partly broken away to show details of construction, and showing a remote cylinder connected to one of the control valve units.

Figure 3 is a bottom plan view of the power lift mechanism, a portion of which is broken away to show in section certain of the cylinders and ducts.

Figure 5 is an elevational view of the housing, drawn to a still larger scale, and showing the valve control casing in section along a plane passing through the axes of the two valve bores.

Figure 6 is a sectional view taken along a line 6—6 in Figure 5 and

Figure 7 is a top plan view of the hydraulic mechanism, the top wall having a portion broken away to show the details of the rockshafts and their connections.

Figure 1:
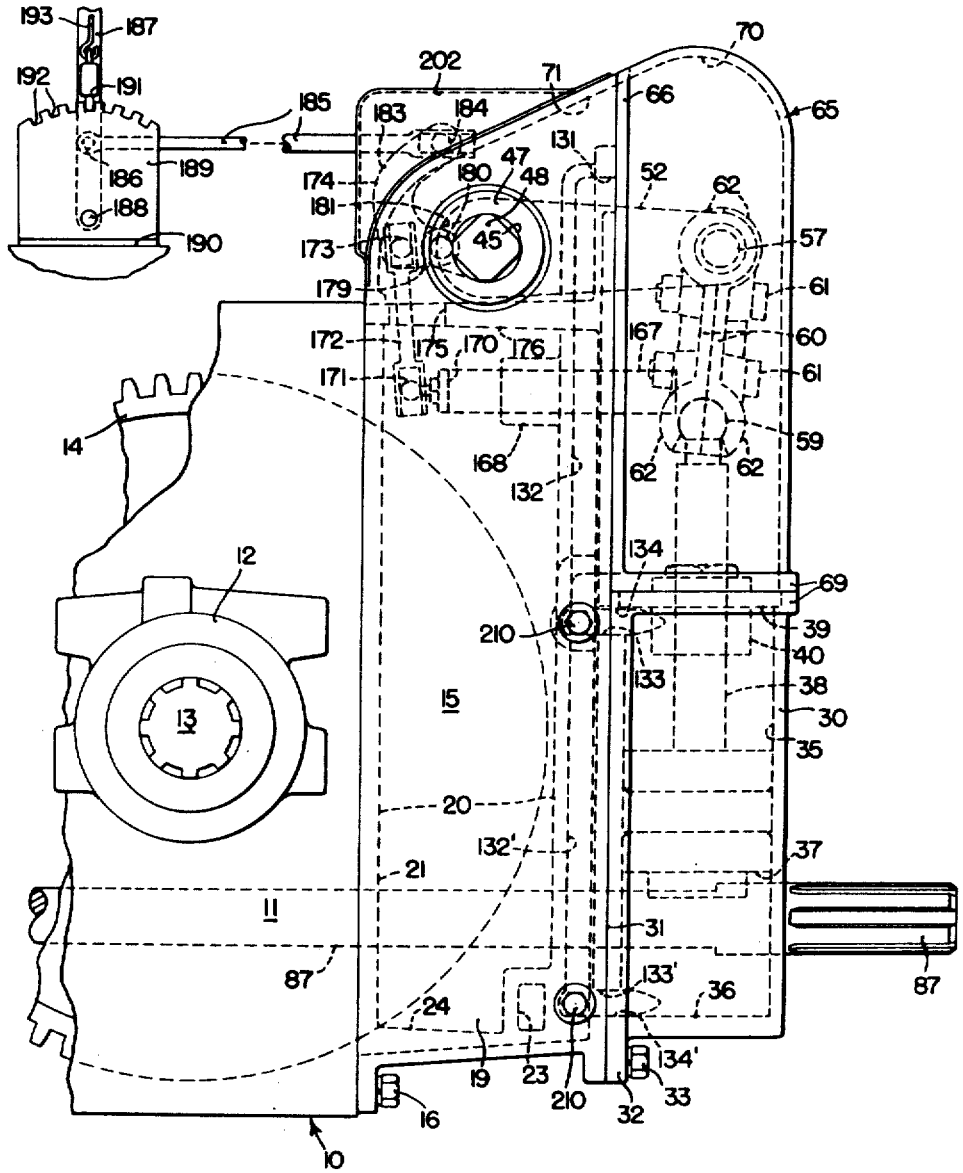

Referring now to the drawings, the tractor is represented by a rear axle housing 10 of the banjo type, including a central gear compartment 11 and a pair of oppositely disposed laterally extending axle housings 12, within which are journaled the wheel supporting axles 13 in a manner well known to those skilled in the art.

A pair of drive gears 14 are mounted on the axles 13 and project rearwardly through an opening in the rear side of the tractor axle housing 11.

According to the principles of the present invention, the power lift mechanism includes a main housing 15, disposed in a generally vertical position over the rear opening in the banjo housing and secured to the latter by a plurality of bolts 16, extending through suitable apertures in the housing 15 and the axle housing 11. The main housing 15 comprises a centrally disposed gear chamber 17, into which the drive gears 14 project and are enclosed thereby. A pair of vertically disposed fore and aft extending walls 18 are spaced inwardly from the two end walls 19 of the housing 15, and each pair of walls 18, 19 defines the sides of a reservoir chamber 20. The reservoirs 20 are also provided with a front wall 21 lying against the back wall flange of the axle housing 11. The rear side of each of the reservoirs 20 is open from the top to the bottom of the main housing 15, the openings being indicated by reference numeral 22. The two reservoirs 20 are interconnected by a transverse passageway or duct 23, cast integrally with the bottom wall 24 of the main housing 15 and extending through the central chamber 17.

A pair of cylinder castings 30 are secured in laterally spaced, vertically disposed positions, on opposite sides of the rear side wall 31 of the main housing 15. The cylinder castings 30 are provided with flanges 32, which are secured to the wall 31 by bolts 33, which extend through suitable apertures in the flanges 32 and through suitable threaded openings 34 in the wall 31. The cylinder castings 30 act as closures for the reservoir openings 22. The cylinder castings 30 are provided with cylinder bores 35, disposed on vertical axes, the lower ends of the bores 35 being closed by end walls 36. A piston 37 is slidable axially within each bore 35 and is provided with an upwardly extending piston rod 38. The upper end of each cylinder bore 35 is closed by a wall 39, which is suitably apertured to allow the piston rod 38 to extend upwardly therethrough, the aperture being sealed by a sealing gland indicated at 40 in Figure 1.

The upper portion of the main housing 15 contains a pair of transversely disposed rockshafts 45, 46, which are disposed in coaxial alignment with their inner ends spaced slightly apart at the center of the housing 15 and their outer ends journaled in laterally extending sleeves 47, cast integrally with the housing 15. The outer ends of the rockshafts 45, 46 are squared, as indicated at 48, for the purpose of receiving suitable lifting arms, to which implement lifting connections can be made, as is well known to those skilled in the art. Inwardly of the supporting sleeves 47, the rockshafts are provided with a second squared portion 50 (see Figures 4 and 7), each of which receives a hub 51, formed integrally with an actuating arm 52. The hub 51 is provided with a square internal aperture, which receives the squared portion 50 of the associated rockshaft and is non-rotatable thereon. Inwardly of the squared portion 50, each of the rockshafts is provided with a cylindrical bearing portion 53 of reduced diameter, which is journaled in a bearing sleeve 54, formed integrally with the inner vertical wall 18. A collar 55 fixed to the inner portion 53 of each rockshaft by a set screw 56, retains the rockshafts within the housing and prevents them from sliding laterally outwardly therefrom.

The outer end of each of the actuating arms 52 is provided with a ball crank 57, rigidly fixed thereto, while the upper end of each of the piston rods 38 is also provided with a ball 59 secured to its upper end. The two balls 57, 59 are interconnected by a pair of link members 60 rigidly clamped together by bolts 61. Each of the link members 60 is provided at opposite ends thereof, respectively, with a substantially hemispherical bearing portion 62, the two portions 62 at either end of the links 60 cooperating to receive the balls 57, 59, to form ball and socket joints for swingably connecting the links 60 with the arm 52 and piston rod 38. Each of the arms 52 extends rearwardly through the opening 22 to position the ball 57 substantially directly above the ball 59, so that vertical movement of the piston 37 in the cylinder bore 35 transmits force through the links 60 to the arm 52, thereby rocking the associated rockshaft about its major axis.

Upper housing portions 65 enclose the links 60 and their ball and socket joints and are provided with laterally extending flanges 66, which lie flat against the wall 31 of the main housing 15 and are secured thereto by bolts 67, which extend through apertures in the flanges 66 and through suitable threaded openings 68 in the wall 31. The adjacent edges of the housing portion 65 and cylinder casting 30 are provided with abutting flanges 69, which fit tightly together to prevent any leakage of oil therebetween. The housing portions 65 are provided with rounded top walls 70, which meet the top wall 71 of the main housing portion 15 and thus totally enclose the connections between the piston rods and the actuating arms 52.

Hydraulic fluid, such as oil, is provided under pressure for actuating the pistons 37 in the bores 35 by means of a pump, indicated in its entirety by reference numeral 80, comprising a flanged cover or housing 81 secured to the main housing wall 31 by bolts 82. A pair of intermeshing pump gears 83, 84 (Figure 4) is disposed within the pump housing 81, and operates in a well known manner to propel the hydraulic fluid from a low pressure port 85 to a high pressure discharge port 86. The pump gear 84 is mounted on a tractor power takeoff shaft 87 which extends rearwardly through the lower portions of the axle housing 11 and the main power lift housing 15, and is journaled in a bearing 88 in the pump housing 81.

The low pressure port 85 is connected by a short passageway or duct 89 with the interconnecting duct 23 (Figure 4), and is preferably formed integrally with the housing wall 31.

The high pressure port 86 connects with a supply duct 90 which extends upwardly therefrom. The port 86 is also connected with a short relief duct 91 (see Figure 4), which is normally closed by a poppet valve 92, the latter being urged into closed position by a strong compression spring 93 which reacts against a plug 94 in the bottom wall 24 of the housing 15. The duct 91 also connects with the transverse connecting duct 23 and the spring 93 is yieldable to pressures appreciably higher than normal operating pressures to prevent damage to the power lift mechanism in case of overload.

The power lift cylinders are controlled by valve mechanism contained in a valve casing 100 disposed directly above the pump housing 81 between the two cylinders and secured to the housing wall 31 by bolts 101. As will be made clear in later detailed description, the fluid passages in the valve housing 100 are provided with ports which register with ports in the wall 31 of the main housing 15, and connect with the pump and the cylinders through ducts formed integrally with the wall 31 on the inner side thereof.

Figure 4:
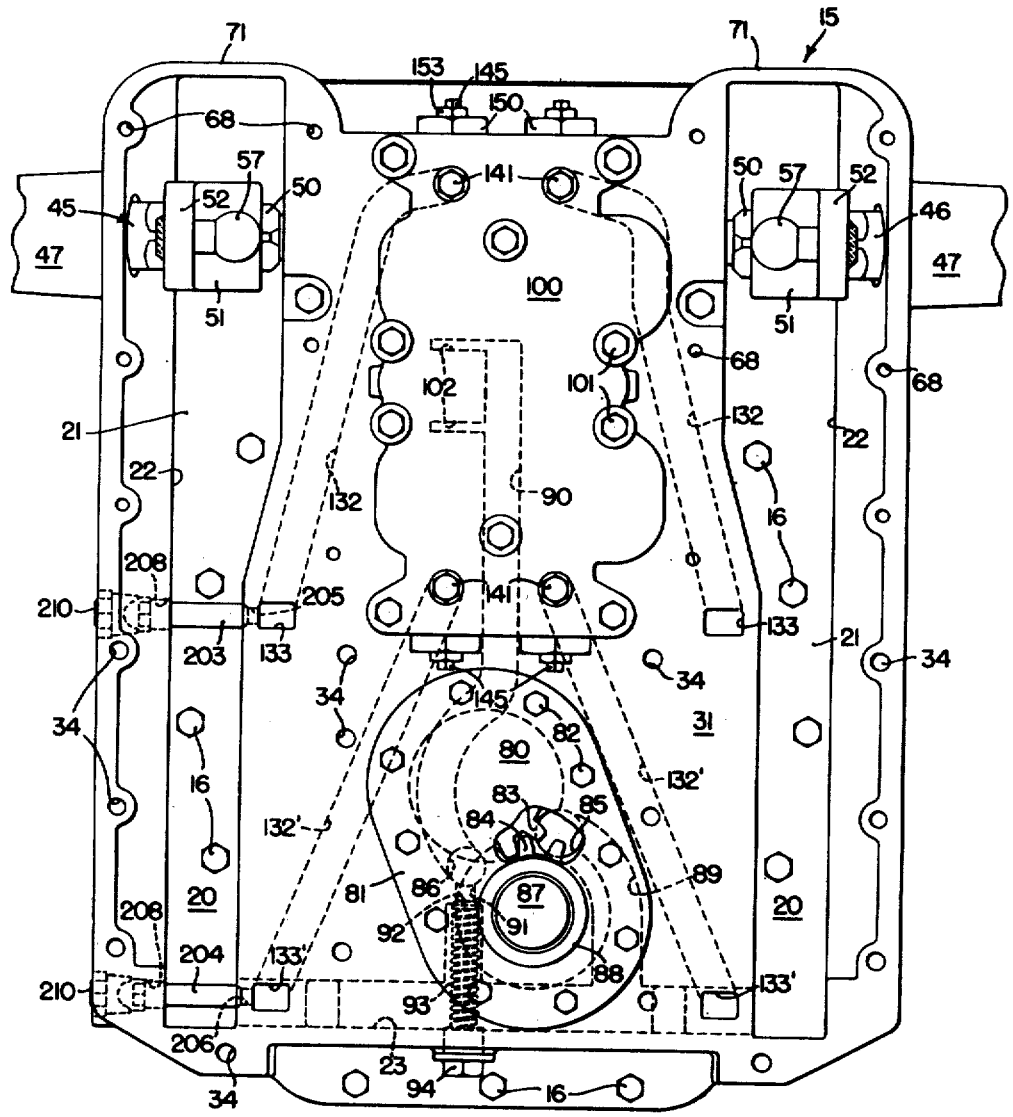
Figure 4 is an elevational view of the control mechanism, drawn to a larger scale, showing the housing with the cylinders detached therefrom.

One of these ducts is the high pressure supply duct 90, which extends upwardly along the housing wall 31 from the pump discharge port 86 and terminates in a pair of vertically spaced ports 102 which extend laterally from the duct 90, as best shown in Figures 4 and 5. The ports 102 register with a pair of upper and lower intake ports 103 in the housing 100, which communicate with a valve bore 104, extending vertically from top to bottom of the housing 100. A cylindrical piston type valve member 106 is slidable axially within the bore 104 and is reduced in diameter near opposite ends thereof, as indicated at 107, providing three axially spaced piston portions, which close the valve bore 104 against flow of oil axially therethrough, including a centrally disposed piston portion 108 and a pair of end closure portions 109.

The center portion 108 is of such length that when the valve member 106 is disposed in its central neutral position, as indicated in Figure 5, the oil is discharged through the intake ports 103 into the valve bore 104 at opposite ends of the central portion 108. A pair of discharge ports 110 is provided in the valve bore 104 at opposite ends of the valve member 106, respectively, and the reduced diameter portions 107 of the valve member have a length sufficient to permit oil to flow along the portions of reduced diameter from the intake ports 103 to the discharge ports 110, when the valve member 106 is in its neutral position. The exhaust or discharge ports 110 are interconnected by a duct 111 extending through the valve casing 100 parallel to the valve bore 104 and serves to conduct the fluid away from the valve bore 104, eventually returning it to the reservoir 20.

Near each end of the valve member 106 between the intake and discharge ports 103, 110, are two ports 115, which are connected by vertically extending U-shaped ducts 116 with a pair of outwardly spaced ports 117 in the valve bore 104. A bushing 118 blocks the valve bore 104 between each pair of ports 115, 117, and is apertured to received the valve stem 119 of a check valve 120. The check valve 120 is a poppet type valve, which seats in an annular closure member 121 through which the valve stem 119 extends. The valve 120 is urged toward seated position in the annular seat 121, by means of a compression spring 122, disposed within a check valve chamber 123 within the bore 104 on the outer side of the annular seat member 121. Within the check valve chamber 123 is disposed a cylindrical cup shaped valve 124, the open end of which bears against the annular seat member 121 around the check valve 120, and the valve member 124 fits closely within the bore 104, the latter being slightly enlarged around the seat member 121 and outwardly therefrom. A discharge aperture 125 is provided in the cylindrical valve member 124, and the latter is rotatable within the valve chamber 123 to direct the fluid which flows through the check valve seat 121 in either of two directions, selectively, as best shown in Figure 6.

Each of the valve chambers 123 communicates with a port 130 in the inner side of the valve casing 100, which is adapted to register with a port 131 in the wall 31. The port 131 is connected in communication with a duct 132, formed integrally with the housing wall 31 on the inner side thereof, which inclines downwardly and outwardly to one end of the adjacent cylinder 35. Thus, the upper valve chamber 123 is connected by the duct 132 to a port 133 in the wall 31, which is adapted to register with a port 134 in the cylinder casting 30 communicating with the cylinder bore 35 at the upper end of the latter. Similarly, the lower valve chamber 123 is connected by the duct 132' to a port 133' in the wall 31, which registers with a port 134' in the lower end of the cylinder bore 35.

The outer side of the valve casing 100 is provided with an internally threaded opening 140 at each of the valve chambers 123 and communicating with the latter opposite the port 130. When the valve mechanism is used to control the integral cylinders 30, these openings are closed by means of plugs 141 (Figure 2) and the cup shaped valve 124 is turned with the aperture 125 registering with the port 130 to direct the oil from the valve chamber 123 into the duct 132.

At other times, it is desirable to use the valve mechanism for controlling remotely disposed cylinders mounted on trailing implements drawn by the tractor, and for this purpose the plugs 141 are removed from the openings 140 and are replaced by fittings 143, to which are connected flexible hoses 144 (see Figures 2 and 6). The hoses 144 are connected at their opposite ends to the two ends of a remote cylinder 142, respectively, within which is disposed a piston 146 connected to a piston rod 147 which extends outwardly through a sealing gland 148 and is provided at its outer end with an eye 149 or other means for connecting the piston rod 147 to a suitable operating element on a drawn implement. When a remote cylinder is connected for operation, the cup shaped valves 124 are rotated 180 degrees to move the discharge aperture 125 into register with the opening 140 to direct the oil into the hose 144 and at the same time to close off the port 130, rendering the integral cylinder inoperative.

Each of the selector valves 124 is provided with a stem 145, which extends axially outwardly from the valve bore 104 in the valve case 100 and the valve 124 is retained in the end of the bore 104 by means of a bushing 150, which is screwed into the outer end of the bore 104. The bushing 150 is provided with an internal threaded recess 151, through which the stem 145 extends, and is sealed by means of suitable packing 152 compressed within the recess around the stem 145 by means of a smaller bushing 153. The outer end of the stem 145 is made square to receive a conventional wrench, by which the stem 145 and hence the valve 124 can be rotated to select either the port 130 or the opening 140 for discharging the oil from the valve chamber 123.

The valve mechanism described hereinabove is similar in most respects to the valve mechanism disclosed in my co-pending application, Serial No. 561,433, filed November 1, 1944, to which reference may be had, if necessary.

The operation of this valve is as follows:

With the valve member 106 in a central neutral position, the fluid in the pump divides through the two ports 102 and flows outwardly along the portions 107 of reduced diameter through the exhaust ports 110 into the duct 111, from which it is returned to the reservoir 20 in a manner to be described later. By shifting the valve member 106 vertically within the bore 104, the piston portion 108 covers one or the other of the inlet ports 103, causing all of the oil to flow through the other of the inlet ports. For example, when the valve member 106 is shifted upwardly, the piston portion 108 completely blocks the upper inlet port 103, whereby the oil flows through the lower inlet port 103 along the lower portion 107 of reduced diameter. At the same time, the lower piston portion 108 blocks the lower discharge port 110, preventing escape of oil therefrom, whereupon the oil flows through the port 115 down through the U-shaped duct 116 and back into the bore beneath the closure member 118. The pressure of the oil against the poppet valve 120 forces the latter open against the pressure of the spring 122, the oil flowing into the valve chamber 123 inside the cup shaped valve 124, and if the latter is turned with the discharge aperture 125 in register with the port 130, the oil flows through the latter and the duct 132' and port 133' into the lower end of the integral cylinder bore 35 through the cylinder port 134'. Thus, the pressure is built up under the piston 37, forcing the latter upwardly and rocking the rockshaft 45 through the actuating arm 52. Upward movement of the piston 37 forces oil out of the upper portion of the cylinder bore 35 through the registering ports 134, 133, returning the oil through the inclined duct 132 to the upper check valve chamber 123 through the registering ports 131, 130 and the aperture 125 in the selector valve 124. The upper check valve stem 119 is engaged by the valve member 106 when the latter is shifted upwardly in the bore 104, raising the valve 120 from its seat 121 and allowing the returning oil to flow downwardly through the seat member 121, port 117, duct 116, into the bore 104 through the port 115. The upper exhaust port 110 is now open, permitting the oil to flow past the upper reduced portion 107 into the discharge duct 111. The upward movement of the piston 37 in the cylinder bore 35 can be checked at any point within its range of movement by merely returning the valve member 106 to neutral position, which permits the upper check valve 120 to close, thereby locking the oil in the upper portion of the cylinder 35, and releasing the oil pressure by opening the lower exhaust port 110, whereupon the lower check valve is closed by its spring 122.

The piston 37 can be lowered in the cylinder 35 by shifting the valve member 106 downwardly within the bore 104, thereby directing oil upwardly through the upper check valve 120 and through the duct 132 to the upper end of the cylinder bore 35. Simultaneously, the valve member 106 engages the stem 119 of the lower check valve 120, opening the latter, to permit oil to flow from the lower end of the cylinder bore 35 through the lower exhaust port 110 into the discharge duct 111. Thus, the piston 37 on the left side of the power lift mechanism is controlled by the valve mechanism on the left side of the valve housing 100, and if desired, the integral or built in cylinder 30 can be made inoperative and the remote cylinder 142 can be substituted therefor.

The valve casing 100 also contains a second valve mechanism in the right side of the housing, for controlling the integral cylinder 30 and its piston 37 on the right hand side of the power lift housing. The second valve mechanism also comprises a vertically disposed bore 104 and valve member 106 slidable axially therein in either direction, selectively, and since the two valve mechanisms are similar in construction in all but a few details, those parts which are similar to parts already described are indicated by similar reference numerals.

One essential difference between the two valve mechanisms is that the inlet ports 103 of the right hand mechanism are connected in communication with the discharge duct 111 by means of short interconnecting passages 160 in the valve casing 100. Another essential difference is that the exhaust ports 110 discharge the oil into exhaust ports 161 which register with ports 162 in the wall 31 of the main housing 15. The ports 162 communicate with laterally extending passages or ducts 163, cast integrally with the housing wall 31 and communicate with the reservoir 20 on the right hand side of the housing 15.

With both valve members 106 in neutral position, the oil circulates from the pump through the supply ducts 90, inlet ports 103 of the left hand valve mechanism, passing out through the exhaust ports 110 into the discharge duct 111, then through the interconnecting passages 160 into the inlet ports 103 of the right hand valve mechanism, and through the exhaust ports 110 through the discharge ducts 163 to the reservoir. If the left hand cylinder 30 is controlled independently, while the right hand valve member 106 is left in neutral position, the oil discharged from the left hand cylinder bore 35 is passed through the valve mechanism in series, and through the reservoir ducts 163. The right hand cylinder can also be controlled independently by leaving the left hand valve mechanism in neutral position, whereupon the oil flows through the latter and through the duct 111 to the right hand valve mechanism, which can be controlled to shift the right hand piston 37 upwardly or downwardly in the cylinder bore 35 in the same manner as described for the left hand piston.

Both pistons 37 can be shifted simultaneously in either direction, that is to say, in either the same or in different directions, by shifting the two valve members 106 from their neutral positions either upwardly or downwardly, simultaneously or successively, as desired. In any event, the oil that is discharged from one side of the left hand cylinder passes through the duct 111 and is directed by the right hand valve mechanism into either end of the right hand cylinders 35, while the oil discharged from the opposite end of the latter is returned through the passages 163 to the reservoir. In the case where both cylinders 35 are loaded simultaneously, the oil must be supplied to the left hand cylinder by the pump 80 at a pressure equal to the sum of the two pressures required to move the two loads, and the pressure used in the left hand cylinder for actuating the rockshaft is the difference between the two pressures on opposite sides of the left hand piston 37. In this case, of course the pressure in the low pressure end of the left hand cylinder 35 is substantially equal to the pressure in the high pressure end of the right hand cylinder 35.

However, in this so-called series connection of the two cylinders 35 and the two valve mechanisms, the amount of oil received by each of the cylinders in any given time interval, is constant regardless of whether the cylinders are controlled simultaneously or separately and therefore the rate of movement of the two rockshafts 45 is constant whether they are actuated simultaneously or separately.

The remote cylinder 142 can be connected to the valve mechanism in either the right hand or left hand position in substitution for the integral cylinder associated therewith, or two remote cylinders can be controlled by the valve mechanism in substitution for both of the integral cylinders 30. Obviously, however, it is desirable that any two cylinders which are to be operated in series connection in the manner described, be of the same volume displacement of oil in order that both cylinders can be operated through their entire length of stroke. In other words, when one remote cylinder and one integral cylinder are used in combination, it is desirable that the amount of oil required for moving the piston throughout its range of stroke within the cylinder be the same for the two cylinders, although the cylinder diameters or length of stroke need not be the same. However, when two remote cylinders are used in combination, they need not be of the same volume displacement as the integral cylinders, although it is desirable that the two remote cylinders have the same volume.

Each of the valve members 106 is shifted axially within its valve bore 104 by means of a gear segment 165 disposed in mesh with a rack 166 formed on the side of the gear member 106 in the central piston portion 108. The gear segment 165 is formed on the end of a shaft 167, which extends through aligned openings in the valve casing 100 and the housing wall 31 and is journalled in a bearing sleeve 168, preferably formed integrally with the housing wall 31. The inner ends of the valve actuating shafts 167 are disposed within the gear housing chamber 17 of the main housing 15 and are provided with crank arms 170, which extend inwardly toward each other and carry on their inner ends a pair of ball shaped cranks 171. Each of the cranks 171 is swingably connected to the lower end of a vertically disposed link 172 which extends upwardly therefrom and is swingably connected by a suitable pivot 173 to the intermediate portion of a bell crank 174 in the upper part of the main housing 15. The links 172 extend through openings 175 in a horizontal housing partition 176 which separates the rockshaft 45 from the lower portion of the central chamber 17. The bell crank 174 has a short arm 179 connected by a pivot 180 to a short arm 181, formed integrally with a hub 182 fixed to the associated rockshaft 45, the inner end of which is formed in a square cross section in order to prevent relative rotation between the hub 182 and the rockshaft. The bell crank 174 also has a relatively long upwardly extending arm 183, which is swingably connected by a suitable pivot 184 to a control rod 185 which extends forwardly and is connected at its forward end by a pivot 186 to a control lever 187 that is pivoted at 188 on a bracket 189 rigidly mounted on the operator's platform 190 of the tractor. The two control levers 187 are disposed in side by side relation and are provided with suitable securing latches 191, which engage any of a plurality of notches 192 in the upper edges of the brackets 189, for holding the control levers 187 in adjusted position.

By virtue of the connections between each of the control levers 187 and its valve actuating shaft 167, the extent of movement of the control lever 187 about its pivot support 188 is proportional to the extent of movement of the associated piston 37 in the cylinder bore 35, and the position of the control lever 187 is indicative of the position of the piston in the cylinder.

For example, referring to Figure 1, the control lever 187 is latched at the center of its range of movement along the notched sector 192, indicating that the piston 37 is substantially midway in its range of movement in the cylinder 35. Assuming that it is desired to adjust the piston 37 upwardly in the cylinder 35, the latch 191 is disengaged by raising it through the actuating link 193 and the lever 187 is swung toward the right a desired distance, and relatched by releasing the control rod 193. Inasmuch as the piston 37 is hydraulically locked within the cylinder 35 in any stationary position, the rockshaft 45 is also locked in position, and therefore movement of the lever 187 to the right swings the bell crank 174 in a clockwise direction about the pivot 180, which is held stationary by the arm 181 on the rockshaft. This causes the link 172 to be shifted upwardly, thereby swinging the arm 170 upwardly and rotating the shaft 167 about its major axis in a counterclockwise direction, as viewed in Figure 5. This movement has the effect of raising the valve member 106 in the valve bore 104, directing a flow of oil into the bottom of the cylinder bore 35 as explained above. Since a very slight movement of the valve member 106 initiates a flow of oil into the bottom of the cylinder 35, the piston 37 immediately begins to move upwardly, acting through the arm 52 to rock the rockshaft 45 in a counterclockwise direction, as viewed in Figure 1, thereby swinging the arm 181 downwardly and thereby shifting the link 172 and arm 170 downwardly to return the valve member 106 to the neutral position. Hence, a short movement of the lever 187 toward the right, as viewed in Figure 1, will adjust the piston 37 a short distance upwardly in the cylinder 35, but if the lever 187 is continued to be moved toward the right as the rockshaft swings in a counterclockwise direction, the link pivot 173 can be raised as fast as the arm pivot 180 is lowered by movement of the rockshaft. Thus, the arm 170 can be held in raised position, thereby maintaining the valve member 106 in raised position in the valve bore 104 and causing the piston 37 to continue it upward movement in the cylinder 35. However, whenever the control lever 187 is latched in any adjusted position, movement of the rockshaft 45 acts through the link 172 to return the valve member 106 to neutral position, stopping the movement of the piston 37 in the cylinder 35.

Conversely, by moving the control lever 187 toward the left, as viewed in Figure 1, causes the bell crank 174 to be pivoted about its pivot 180 in a counterclockwise direction, thereby moving the link 172 downwardly to rock the control shaft 167 in a clockwise direction, as viewed in Figure 5, shifting the valve member 106 downwardly in the valve bore 104, with the result that the oil is forced into the upper end of the cylinder bore 35, urging the piston 37 downwardly therein. As long as the control lever 187 is shifted toward the left about its pivot 188, the piston 37 will continue its movement downwardly in the cylinder 35, but will be arrested in its movement whenever the control lever 187 is latched to one of the notches 192.

Obviously, since the follow-up action is obtained by the rotation of the rock shaft 45, this effect is not normally obtained when the integral cylinder is replaced by a remote cylinder, for when the selector valves 124 are rotated to direct oil to the remote cylinder and block any flow of oil to or from the integral cylinder, the piston 37 is hydraulically locked against movement in either direction in the cylinder bore 35, thereby rigidly locking the rockshaft associated therewith. This holds the pivot 180 stationary, but permits the bell crank 174 to swing angularly about the axis of the pivot 180 to raise and lower the link 172 and thus actuates the valve member 106 up or down within the valve bore 104. In this case, the control lever 187 has a very limited range of movement on each side of its neutral position and must be returned manually to return the valve member 106 to its neutral position to stop the movement of the piston 146 in the remote cylinder 142.

According to the principles of the present invention, however, I am able to quickly and easily convert the hydraulic mechanism described hereinbefore to provide a follow-up control piston for a single remote cylinder. To obtain this type of control, the remote cylinder 142 is connected as illustrated in the drawings to the left hand valve mechanism, and the two rockshafts 45, 46 are coupled together by means of a sleeve coupling 200 (see Fig. 7). The sleeve coupling 200 is normally in the disconnected position shown in solid lines, but for the purpose now being described, the coupling is shifted laterally to the position indicated in dotted lines, connecting the rockshafts 45, 46 rigidly together. Set screws 201 are provided in the sleeve 200 for securing the latter in either position. This connection can be made simply by removing a sheet metal cover 202, which closes the top of the rockshaft compartment in the center of the housing 15. The only other necessary acts of conversion are to remove a pair of valve plugs 203, 204 from their seats in a pair of ports 205, 206 in the cylinder ducts 132, 132', respectively (Figures 3 and 4). The valve plugs 203, 204 extend transversely across the reservoir 20 and are provided with threaded head portions 207, which are engaged in threaded openings 208 in the side wall 19 of the main housing 15. At these points, the wall 19 is sufficiently thick to permit a plug 210 to be threaded into the outer end of the opening 208 to prevent the valves 203, 204 from being accidentally or inadvertently loosened from their seat. The remote cylinder 142 is now connected in place of the left hand integral cylinder, but the follow-up valve mechanism on the latter is connected through the coupled rockshaft 45, 46 to be actuated by the integral cylinder on the right side of the mechanism. Therefore, in view of the fact that the remote cylinder is in series connection with the right hand integral cylinder, and the two cylinders are preferably of the same fluid capacity, they will reach the end of their stroke at the same instant, and therefore if they are controlled together the integral cylinder will serve as a metering cylinder for the remote cylinder, and hence the follow-up mechanism will cause the control levers 187 to serve as an indication of the position of the remote piston 146 in the cylinder 142. Hence, it is but necessary to move the two control levers 187 together, thereby moving the piston in the remote cylinder and the piston in the right hand integral cylinder in unison, and since the rockshafts are coupled together the left hand piston 37 is raised and lowered in its cylinder while the fluid in that cylinder is caused to flow in and out through the open ports 205, 206 with substantially no pressure being developed.

The control levers 187 can be moved together by the operator and for this purpose can be placed close enough together to make it possible for him to operate both levers with one hand; alternatively this result can be facilitated by interconnecting the two levers by means of a coupler 215 (see Figure 7) which is similar to the coupler 200 for the two rockshafts but is used to couple the two pivot pins 186, which are extended inwardly toward each other for this purpose. In Figure 7, the coupler 215 is shown in its disconnected position, but it may be easily connected by sliding the sleeve 215 over the end of the right hand pivot pin 186 and securing the coupling to the two pins 186 by means of set screws 216. One of the latches 191 should be secured out of engagement with its sector 189 and the other control lever is then used to control the load connected to the remote cylinder.

I do not intend my invention to be limited to the exact details shown and described herein except as set forth in the claims which follow.

I claim:

1. Power lift mechanism comprising, in combination, a housing serving as a reservoir, a pair of rockshafts journaled in said housing and projecting laterally from oposite ends thereof, respectively, one wall of said housing having a plurality of spaced openings therein, a pair of actuating means fixed to said rockshafts, respectively, and including arms extending radially therefrom through certain of said openings, hydraulic cylinders mounted at said wall of the housing and having piston rods connected with said actuating arms, respectively, and hydraulic control mechanism disposed adjacent said cylinders and mounted on wall of the housing over certain other of said openings, for controlling said cylinders.

2. Tractor power lift mechanism comprising in combination, a main housing adapted to be mounted vertically on the rear axle housing of a tractor, a pair of coaxial rockshafts journaled in the upper portion of said housing and projecting laterally from opposite ends thereof, respectively, said housing serving as a reservoir for hydraulic fluid and having a plurality of laterally spaced openings in the rear wall thereof, a pair of actuating arms fixed to said rockshafts in laterally spaced arrangement and extending rearwardly therefrom through two of said openings, hydraulic cylinders mounted on said rear wall in vertical positions and having piston rods connected with said actuating arms, respectively, housing portions enclosing said actuating arms and piston rod connections, and hydraulic control mechanism including casing means mounted on said rear wall between said pair of cylinders over certain other of said openings, for controlling said cylinders.

3. Tractor power lift mechanism comprising in combination, a main housing adapted to be mounted vertically on the rear axle housing of a tractor, a pair of coaxial rockshafts journaled in the upper portion of said housing and projecting laterally from opposite ends thereof, respectively, said housing serving as a reservoir for hydraulic fluid and having a plurality of laterally spaced openings in the rear wall thereof, a pair of actuating arms fixed to said rockshafts in laterally spaced arrangement and extending rearwardly therefrom through two of said openings, hydraulic cylinders mounted on said rear wall in vertical positions and having piston rods connected with said actuating arms, respectively, housing portions enclosing said actuating arms and piston rod connections, hydraulic control mechanism including a valve casing and a fluid pump casing mounted on said rear wall between said cylinders over certain other of said openings, and ducts for hydraulic fluid, formed integrally with said main housing, interconnecting said pump and valve casings and connecting said valve casing with said cylinders, said ducts terminating in ports in said rear wall adapted to register with ports in said cylinders and casings, respectively.

4. Power lift mechanism comprising, in combination, a housing serving as a reservoir, a pair of rockshafts journaled in said housing and projecting laterally from opposite ends thereof, respectively, one wall of said housing having a plurality of spaced openings therein, a pair of actuating means fixed to said rockshafts, respectively, and including arms extending radially therefrom through certain of said openings, hydraulic cylinders mounted at said wall of the housing and having piston rods connected with said actuating arms, respectively, hydraulic control mechanism including a fluid pump and a valve casing mounted on said side wall between said cylinders over certain other of said openings, a pair of interconnected control valves disposed in said valve casing, said wall having ducts formed integrally with said housing and connecting one of said valves with both ends of one of said cylinders and the other of said valves with the other of said cylinders, and duct means connecting said pump with one of said valves, the last named valve being adapted to direct fluid from said pump to either end of its associated cylinder, selectively, and to direct fluid from the other end of said associated cylinder to the other of said valves, said other valve being adapted to direct the fluid to said reservoir directly, or to either end of its associated cylinder, selectively, and to direct fluid from the other end of the latter to said reservoir.

5. Tractor power lift mechanism comprising in combination, a main housing adapted to be mounted vertically on the rear axle housing of a tractor, a pair of coaxial rockshafts journaled in the upper portion of said housing and projecting laterally from opposite ends thereof, respectively, said housing serving as a reservoir for hydraulic fluid and having a plurality of laterally spaced openings in the rear wall thereof, a pair of actuating arms fixed to said rockshafts in laterally spaced arrangement and extending rearwardly therefrom through two of said openings, hydraulic cylinders mounted on said rear wall in vertical positions and having piston rods connected with said actuating arms, respectively, housing portions enclosing said actuating arms and piston rod connections, hydraulic control mechanism including a fluid pump and a valve casing mounted on said rear wall between said cylinders over certain other of said openings, a pair of interconnected control valves disposed in said valve casing, said wall having ducts formed integrally with said main housing connecting one of said valves with both ends of one of said cylinders and the other of said valves with the other of said cylinders, and duct means connecting said pump with one of said valves, the last named valve being adapted to direct fluid from said pump to either end of its associated cylinder, selectively, and to direct fluid from the other end of said associated cylinder to the other of said valves, said other valve being adapted to direct the fluid to said reservoir directly, or to either end of its associated cylinder, selectively, and to direct fluid from the other end of the latter to said reservoir.

6. Power lift mechanism comprising, in combination, a housing serving as a reservoir, a pair of rockshafts journaled in said housing and projecting therefrom, one wall of said housing having a plurality of spaced openings therein, a pair of actuating means fixed to said rockshafts, respectively, and including arms extending radially therefrom through certain of said openings, hydraulic cylinders mounted at said wall of the housing and having piston rods connected with said actuating arms, respectively, hydraulic control mechanism disposed alongside said cylinders and mounted at said wall of the housing over certain other of said openings, for controlling said cylinders, said control mechanism including means for connecting the same to remotely disposed cylinders, and a plurality of 3-way valves associated with said control mechanism for connecting the latter either to said mounted cylinders or to said remote cylinders, selectively.

7. Tractor power lift mechanism comprising in combination, a main housing adapted to be mounted vertically on the rear axle housing of a tractor, a pair of coaxial rockshafts journaled in the upper portion of said housing and projecting laterally from opposite ends thereof, respectively, said housing serving as a reservoir for hydraulic fluid and having a plurality of laterally spaced openings in the rear wall thereof, a pair of actuating arms fixed to said rockshafts in laterally spaced arrangement and extending rearwardly therefrom through two of said openings, hydraulic cylinders mounted on said rear wall in vertical positions and having piston rods connected with said actuating arms, respectively, housing portions enclosing said actuating arms and piston rod connections, hydraulic control mechanism including a valve casing and a fluid pump casing mounted on said rear wall between said cylinders over certain other of said openings, and ducts for hydraulic fluid, formed integrally with said main housing, interconnecting said pump and valve casings and connecting said valve casing with said cylinders, said ducts terminating in ports in said rear wall adapted to register with ports in said cylinders and casings, respectively, said control means including means for connecting the same to remotely disposed cylinders, and a plurality of 3-way valves associated with said control valves for connecting the latter either to said cylinder ducts or to said remote cylinder connections, selectively.

8. Power lift mechanism comprising a casing having a cylindrical bore provided with inlet and outlet ports, there being chambers provided in either end of said casing, respectively, a piston type valve member shiftable axially within said bore to direct hydraulic fluid between said ports, selectively, poppet type check valves disposed adjacent opposite ends of said bore, respectively, and having stems engageable by said valve member for connecting said valve bore in communication with said chambers, respectively, each of said chambers having a pair of ducts connected therewith, and a 3-way valve disposed in each of said chambers and shiftable to connect either of said ducts in communication with the associated chamber and to close the other of said ducts, selectively, and a pair of hydraulic motors connected with said pair of ducts, respectively.

9. Power lift mechanism comprising a casing having a cylindrical bore provided with inlet and outlet ports, a piston type valve member shiftable axially within said bore to direct hydraulic fluid between said ports, selectively, closures disposed in said bore beyond opposite ends of said valve member defining a pair of check velve chambers, said closures being apertured to provide check valve ports, a poppet type check valve disposed in each of said check valve ports and having inwardly directed valve stems adapted to be engaged by said piston valve member, each of said chambers having a pair of ducts connected therewith, a pair of double acting cylinders, one end of each cylinder being connected to said pair of ducts, respectively, leading to one of said chambers, and the other end of each cylinder being connected, respectively, to the pair of ducts leading to the other of said chambers, and a 3-way valve associated with each chamber for connecting the latter with either of said ducts connected thereto, selectively.

10. The combination set forth in claim 9, including the further provision that each of said 3-way valves comprises a cup-shaped element disposed in said chamber enclosing the check valve and rotatable about the axis of said bore, said element having a port rotatable into register with either of said ducts, selectively.

11. The combination set forth in claim 9, including the further provision that each of said 3-way valves comprises a cylindrical element journaled in the outer end of said bore inside the check valve chamber and having an open end enclosing said check valve and bearing against said closure member to receive fluid from said check valve, the outer end of said element having a stem extending out of said bore, a closure bushing in the outer end of said bore and apertured to receive said stem, said chamber having ports in the cylindrical wall thereof to which said ducts are connected, and said element having a port rotatable into register with either of said wall ports by turning said stem from outside said chamber to connect the latter with either of said double acting cylinders, selectively.

12. Tractor power lift mechanism comprising, in combination, a main vertically disposed housing serving as a reservoir, a pair of coaxially aligned rockshafts journaled in the upper portion of said housing and projecting laterally from opposite ends thereof, respectively, one side wall of said housing having a plurality of laterally spaced openings therein, a pair of actuating arms fixed to said rockshafts, respectively, and extending radially therefrom through certain of said openings, hydraulic cylinders mounted on said side of the housing in vertical positions and having piston rods connected with said actuating arms, respectively, hydraulic control mechanism including a fluid pump and a valve casing mounted on said rear wall between said cylinders over certain other of said openings, said valve casing having a pair of cylindrical bores provided with inlet and outlet ports, a piston type valve member shiftable axially within each of said bores to direct hydraulic fluid between said ports, selectively, said wall having ducts formed integrally with said main housing connecting the inlet port of one of said bores with said pump, duct means connecting an outlet port of said one bore with an inlet port of the other of said bores, an outlet port of the latter being connected with said reservoir, closures disposed in each of said bores beyond opposite ends of said valve member defining a pair of check valve chambers therein, said closures being apertured to provide check valve ports, a poppet type check valve disposed in each of said check valve ports and having inwardly directed valve stems adapted to be engaged by said piston valve member, each of said chambers having a port connected by duct means in said housing with one end of one of said mounted cylinders, the two chambers associated with opposite ends of each bore being connected with the two ends of one of said cylinders and the two chambers associated with the other bore being connected with the two ends of the other cylinder, respectively, a pair of hose connections associated with each of said valve bores for connecting opposite ends of a remotely disposed double acting cylinder with said check valve chambers, respectively, and 3-way valve means disposed in each of said chambers for connecting each of said bores either to the said mounted cylinder or the said remote cylinder associated therewith, selectively, said valve member in said pump connected bore being shiftable in opposite directions to direct fluid from said pump to either of said valve chambers for distribution to one end of either of the double acting cylinders associated therewith, and to direct fluid from the other end of the last mentioned cylinder to the other of said valve bores, the piston valve member in the latter being shiftable from a neutral position in which the fluid is directed to the reservoir directly, to opposite active positions for directing the fluid to either end of the selected double acting cylinder associated therewith, the fluid from the other end of the latter being discharged to the reservoir.

13. In hydraulic mechanism comprising a pair of double acting hydraulic power cylinders, pistons double acting hydraulic power cylinders, pistons shiftable therein, a control valve for each cylinder, duct means connecting each of said valves with both ends of its respective cylinder, each valve having a member shiftable in opposite directions from a neutral position for directing hydraulic fluid into either end of the cylinder, selectively, a power driven pump connected to deliver fluid to one of said valves for delivery into either end of the associated cylinder, connections between said valves to direct fluid from the other end of the last mentioned cylinder to the other of said valves for delivery into either end of the other of said cylinders, a discharge port in said other valve for discharging fluid from the opposite end of said other cylinder, a control lever for each valve and a differential connection between said associated control lever, valve member, and piston whereby said valve member is shifted by said control lever to initiate a movement of said piston in either direction, said piston movement being transmitted through said differential connection to return said valve member to neutral position to stop said piston, the combination of a third power cylinder disposed remotely from said pair of cylinders and means for converting said hydraulic mechanism for controlling said third cylinder comprising means for connecting the latter with one of said control valves in place of the cylinder associated therewith, means for rendering said associated cylinder inoperative to prevent the latter from being subjected to pressure during operation, and means for establishing a mechanical connection between said valve members, to effect a simultaneous returning of said members to said neutral position responsive to movement of the operative cylinder of said pair of cylinders, whereby the latter cylinder of said pair serves as a metering cylinder to determine the position of said remote cylinder.

14. In hydraulic mechanism comprising a pair of double acting hydraulic power cylinders, pistons shiftable therein, a control valve for each cylinder, duct means connecting each of said valves with both ends of its respective cylinder, each valve having a member shiftable in opposite directions from a neutral position for directing hydraulic fluid into either end of the cylinder, selectively, a power driven pump connected to deliver fluid to one of said valves for delivery into either end of the associated cylinder, connections between said valves to direct fluid from the other end of the last mentioned cylinder to the other of said valves for delivery into either end of the other of said cylinders, a discharge port in said other valve for discharging fluid from the opposite end of said other cylinder, a control lever for each valve and a differential connection between said associated control lever, valve member, and piston whereby said valve member is shifted by said control lever to initiate a movement of said piston in either direction, said piston movement being transmitted through said differential connection to return said valve member to neutral position to stop said piston, the combination of a third power cylinder disposed remotely from said pair of cylinders and means for converting said hydraulic mechanism for controlling said third cylinder comprising means for connecting the latter to the one of said control valves in place of the cylinder associated therewith, means for coupling together said pistons of said pair of cylinders to move together as a unit, and means for venting both ends of the replaced cylinder to release fluid pressure therein, whereby an adjustment of both of said control levers together effects movement of each of said pistons, the valve members being simultaneously returned to neutral by movement of the other of said pair of pistons, thereby determining the adjusted position of the piston in said remote cylinder.

15. In hydraulic mechanism comprising a pair of rockshafts, a pair of double acting hydraulic power cylinders having pistons connected to rock said rockshafts, a control valve for each cylinder, duct means connecting each of said valves with both ends of its respective cylinder, each valve having a member shiftable in opposite directions from a neutral position for directing hydraulic fluid into either end of the cylinder, selectively, a power driven pump connected to deliver fluid to one of said valves for delivery into either end of the associated cylinder, connections between said valves to direct fluid from the other end of the last mentioned cylinder to the other of said valves for delivery into either end of the other of said cylinders, a discharge port in said other valve for discharging fluid from the opposite end of said other cylinder, a control lever for each valve and a differential connection between said associated control lever, valve member, and piston whereby said valve member is shifted by said control lever to initiate a movement of said piston in either direction, said piston movement being transmitted through said differential connection to return said valve member to neutral position to stop said piston, the combination of a third power cylinder disposed remotely from said pair of cylinders and means for converting said hydraulic mechanism for controlling said third cylinder comprising means for connecting the latter to the one of said control valves in place of the cylinder associated therewith, comprising means for coupling said rockshafts together and means for releasing pressure from both ends of the replaced cylinder, whereby an adjustment of both of said control levers together effects movement of each of said pistons, the valve members being simultaneously returned to neutral position by movement of the other of said pair of pistons, thereby determining the adjusted position of the piston in said remote cylinder.

16. Tractor power lift mechanism comprising, in combination, a main vertically disposed housing serving as a reservoir, a pair of coaxially aligned rockshafts journaled in the upper portion of said housing and projecting laterally from opposite ends thereof, respectively, one side wall of said housing having a plurality of laterally spaced openings therein, a pair of actuating arms fixed to said rockshafts, respectively, and extending radially therefrom through certain of said openings, hydraulic cylinders mounted on said side of the housing in vertical positions and having piston rods connected with said actuating arms, respectively, a control valve for each cylinder, duct means formed integrally with said side wall connecting one of said valves with both ends of one of said cylinders and the other of said valves with the other of said cylinders, each valve having a member shiftable in opposite directions from a neutral position for directing hydraulic fluid into either end of the cylinder, selectively, a power driven pump connected to deliver fluid to one of said valves for delivery into either end of the associated cylinder, connections between said valves to direct fluid from the other end of the last mentioned cylinder to the other of said valves for delivery into either end of the other of said cylinders, a discharge port in said other valve for discharging fluid from the opposite end of said other cylinder, a control lever for each valve and a differential connection between said associated control lever, valve member, and piston whereby said valve member is shifted by said control lever to initiate a movement of said piston in either direction, said piston movement being transmitted through said differential connection to return said valve member to neutral position to stop said piston, the combination of a third power cylinder disposed remotely from said pair of cylinders and means for converting said hydraulic mechanism for controlling said third cylinder comprising means for connecting the latter to the one of said control valves in place of the cylinder associated therewith, means for coupling said rockshafts together, and removable stoppers in said ducts leading to the cylinder associated with said valve to which said remote cylinder is connected, releasing fluid in both ends of the cylinder to the reservoir, whereby an adjustment of both of said control levers together effects movement of each of said pistons, the valve members being simultaneously returned to neutral position by movement of said coupled rockshafts, thereby determining the adjusted position of the piston in said remote cylinder.

17. Tractor power lift mechanism comprising, in combination, a main vertically disposed housing serving as a reservoir, a pair of rockshafts journaled in the upper portion of said housing and projecting laterally from opposite ends thereof, respectively, one side wall of said housing having a plurality of laterally spaced openings therein, a pair of actuating arms fixed to said rockshafts, respectively, and extending radially therefrom through certain of said openings, hydraulic cylinders mounted on said side of the housing in vertical positions and having piston rods connected with said actuating arms, respectively, hydraulic control mechanism disposed alongside said cylinders and mounted on said side of the housing over certain other of said openings for controlling said cylinders, and ducts for hydraulic fluid, formed integrally with said main housing, interconnecting said control mechanism and said cylinders, said ducts terminating in certain of said openings serving as ports in said wall adapted to register with ports in said cylinders and control mechanism, respectively.

FRANK T. COURT.

REFERENCES CITED

The following references are of record in the file of this patent:

UNITED STATES PATENTS

| Number | Name | Date |
|---|---|---|
| 165,537 | Buffon | July 13, 1875 |
| 1,759,647 | Kincannon | May 20, 1930 |
| 1,827,470 | Harrison | Oct. 13, 1931 |
| 1,955,154 | Temple | Apr. 17, 1934 |
| 2,052,827 | Hexamer | Sept. 1, 1936 |
| 2,274,527 | Buran | Feb. 24, 1942 |
| 2,276,357 | Vickers | Mar. 17, 1942 |
| 2,304,380 | Shaeffer | Dec. 8, 1942 |
| 2,337,637 | Brown | Dec. 28, 1943 |

FOREIGN PATENTS

| Number | Country | Date |
|---|---|---|
| 17,846 | Great Britain | Nov. 8, 1889 |

Certificate of Correction

Patent No. 2,450,270.                                September 28, 1948.

FRANK T. COURT

It is hereby certified that errors appear in the printed specification of the above numbered patent requiring correction as follows:

Column 12, line 54, claim 1, after "on" and before "wall" insert the word *said*; column 15, line 25, claim 9, for "check velve" read *check valve*; column 16, line 58, claim 13, strike out "double acting hydraulic power cylinders, pistons";

and that the said Letters Patent should be read with these corrections therein that the same may conform to the record of the case in the Patent Office.

Signed and sealed this 28th day of December, A. D. 1948.

[SEAL]

THOMAS F. MURPHY,
*Assistant Commissioner of Patents.* able stoppers in said ducts leading to the cylinder associated with said valve to which said remote cylinder is connected, releasing fluid in both ends of the cylinder to the reservoir, whereby an adjustment of both of said control levers together effects movement of each of said pistons, the valve members being simultaneously returned to neutral position by movement of said coupled rockshafts, thereby determining the adjusted position of the piston in said remote cylinder.

17. Tractor power lift mechanism comprising, in combination, a main vertically disposed housing serving as a reservoir, a pair of rockshafts journaled in the upper portion of said housing and projecting laterally from opposite ends thereof, respectively, one side wall of said housing having a plurality of laterally spaced openings therein, a pair of actuating arms fixed to said rockshafts, respectively, and extending radially therefrom through certain of said openings, hydraulic cylinders mounted on said side of the housing in vertical positions and having piston rods connected with said actuating arms, respectively, hydraulic control mechanism disposed alongside said cylinders and mounted on said side of the housing over certain other of said openings for controlling said cylinders, and ducts for hydraulic fluid, formed integrally with said main housing, interconnecting said control mechanism and said cylinders, said ducts terminating in certain of said openings serving as ports in said wall adapted to register with ports in said cylinders and control mechanism, respectively.

FRANK T. COURT.

REFERENCES CITED

The following references are of record in the file of this patent:

UNITED STATES PATENTS

| Number | Name | Date |
| --- | --- | --- |
| 165,537 | Buffon | July 13, 1875 |
| 1,759,647 | Kincannon | May 20, 1930 |
| 1,827,470 | Harrison | Oct. 13, 1931 |
| 1,955,154 | Temple | Apr. 17, 1934 |
| 2,052,827 | Hexamer | Sept. 1, 1936 |
| 2,274,527 | Buran | Feb. 24, 1942 |
| 2,276,357 | Vickers | Mar. 17, 1942 |
| 2,304,380 | Shaeffer | Dec. 8, 1942 |
| 2,337,637 | Brown | Dec. 28, 1943 |

FOREIGN PATENTS

| Number | Country | Date |
| --- | --- | --- |
| 17,846 | Great Britain | Nov. 8, 1889 |

---

Certificate of Correction

Patent No. 2,450,270.         September 28, 1948.

FRANK T. COURT

It is hereby certified that errors appear in the printed specification of the above numbered patent requiring correction as follows:

Column 12, line 54, claim 1, after "on" and before "wall" insert the word *said*; column 15, line 25, claim 9, for "check velve" read *check valve*; column 16, line 58, claim 13, strike out "double acting hydraulic power cylinders, pistons";

and that the said Letters Patent should be read with these corrections therein that the same may conform to the record of the case in the Patent Office.

Signed and sealed this 28th day of December, A. D. 1948.

[SEAL]

THOMAS F. MURPHY,
*Assistant Commissioner of Patents.*